Patented Jan. 10, 1933

1,894,088

UNITED STATES PATENT OFFICE

HARRY M. DENT, OF BUFFALO, NEW YORK, ASSIGNOR TO GENERAL PLASTICS, INC., A CORPORATION OF NEW YORK

METHOD OF MAKING PHENOLIC CONDENSATION PRODUCTS

No Drawing    Application filed February 15, 1929. Serial No. 340,344.

This application relates to a method of producing condensation products of formaldehyde and a phenolic body, and is particularly aimed to provide an efficient method of making such products from so-called crude phenol, which is largely made up of the higher homologues of phenol and may contain only a small percentage of phenol.

Prior to my present invention, many attempts had been made to utilize these higher homologues in the manufacture of molding products but in all such attempts where a resinous body has been produced, capable of "setting up" in anything like a commercially practicable length of time, it will be found that while the material has been dried, the reaction has gone on so far that the melting point of the resin has risen to a point well above the reaction temperature. This means that when such material is molded with heat, it may become plastic, but before it melts the condensation reaction sets in to harden it. This condition has two great drawbacks. In the first place, there is great danger that during the drying (and necessary subsequent cooling) the reaction will go so far that the material is ruined, and second, even if the reaction is stopped at exactly the best time, it will not flow readily in the mold and will not have the highly desirable "wetting" quality, that is, the quality of thoroughly covering all the fibrous filler that may be used.

By my present invention I am able to produce a resinous compound from the higher homologues of phenol which will set up quickly at ordinary molding temperatures, that is, temperatures above 125 deg. C., but which has a melting point, when dry, substantially below 100 deg. C. and which is substantially nonreactive at temperatures approaching 100 deg. C. This makes control and use of the resin very simple. The preliminary condensation is conducted in the presence of water and is carried on at the boiling temperature (100 deg. C.). The drying may be conducted with vacuum so that the temperature is maintained substantially below 100 deg. C. and the resulting resin will in all cases be fluid to run out of the kettle readily, and later to flow in the mold and wet the fillers before it sets up. Inasmuch as my process is applicable to the higher homologues of phenol as well as to phenol itself, I am able to use as a raw material the very crude grade of raw material known as "phenol oil" which contains a large percentage of the higher homologues of phenol. I also prefer to add all of the necessary formaldehyde in the form of the aqueous solution at the beginning of the operation, but this is not necessary as the excess of formaldehyde over equal molecular proportions could be added later with the ammonia, either in aqueous solution or as hexamethylene-tetramine.

In carrying out my process on this basis, I mix with the crude phenolic material sufficient aqueous solution of formaldehyde ultimately to produce the infusible insoluble body (for example 3 mols of formaldehyde for each 2 mols of phenolic body) and use an alkali catalyst such as the oxide or hydroxide of an alkali metal or an alkali earth metal. This mixture is boiled and the condensation carried on until analysis shows that approximately one mol of formaldehyde is combined for each mol of phenolic body present. An experienced operator can tell with sufficient exactness when this condition has been reached by the appearance of the material, which tends at this point to form a layer separation.

The resin thus formed has a melting point well below 100 deg. C., but it is so reactive even at relatively low temperatures that it is practically impossible to dry out the water without causing the reaction to go on to the point where the melting point is substantially raised, and there is great danger that the material will set up in the kettle.

I have found that this danger can be obviated without impairing the quality of the resin produced, by neutralizing the alkali as soon as the first condensation is completed, by adding an acid in the theoretical amount based on the amount of alkali originally introduced. The alkali and acid used may be selected depending upon the use to which the final product is to be put so that the salts formed in the mixture will not be injurious, but the acid selected should be one which will combine with the base present to form an insoluble body. For example, if lime is used as the catalyst, sulphuric acid may be used as a neutralizing agent, forming calcium sulphate in the material which having been precipitated throughout the mass will serve as a filler and have no injurious action, particularly for insulation. There is thus produced a substantially neutral mass of low melting point, comprising phenolic bodies, each molecule of which is condensed with one molecule of formaldehyde and the whole is mixed with additional formaldehyde in aqueous solution. If insufficient formaldehyde was used in the first instance, the necessary additional amount can be added at this time.

Inasmuch as the original catalyst has been rendered useless by neutralizing, additional catalytic material must be added to accomplish the final setting up. For this purpose, I add to the aqueous formaldehyde sufficient ammonia to combine with the free formaldehyde to form hexamethylene-tetramine, which in turn probably combines with the phenolic condensation products. Apparently the hexamethylene-tetramine has little or no catalytic action at temperatures below 100 deg. C., and I find that I can now dry the material by the use of heat and vacuum without substantially increasing the melting point of the resin or running any risk of having the batch set up in the kettle or on the rolls where it is combined with the usual filler.

As a further economy I find that the two steps of neutralizing the alkali and adding the ammonia can be conducted simultaneously by using the ammonium salt of an acid which will form an insoluble body with the alkali that has been used. Thus for most purposes, I can add ammonium sulphate directly to the product of the first condensation. In such case this salt will go into solution, and mix thoroughly with the other components, but as the dissolved salt contacts with the alkali, the acid radical will combine with the alkali and the ammonia radical will condense with the excess formaldehyde. By utilizing this technique, I am able to produce a condensation product of most excellent qualities for use in making molding compounds, from the cheapest possible sources of raw material, as the only ingredients that I need to use are crude phenol, formaldehyde, an alkali catalyst such as lime and an ammonium salt such as ammonium sulphate. At the same time the control of the operation is very simple, for the first reaction in the presence of the alkali catalyst is conducted by boiling with a large amount of water present, and is stopped before enough water is driven off to permit the reaction going too far. By neutralizing the original alkali catalyst and substituting ammonia as a catalyst the temperature requirement for further condensation is so changed that the material can be dried and worked without any difficulty and without substantially raising its original melting point which is well below the temperature of further active reaction. However, due to the fact that the original condensation caused a reaction to take place between the formaldehyde and the phenolic material in substantially equal molecular proportions and additional quantities of formaldehyde and catalyst are distributed thoroughly throughout the mass as a result of a chemical reaction, the resin is one which will set up with great rapidity when compounded with the usual fillers and molded at the usual molding temperatures. Thus using a molding temperature above 125 deg. C., a piece one-eighth of an inch thick will be thoroughly cured in less than two minutes.

What I claim is:

1. The process of producing condensation products from phenolic bodies comprising higher homologues of phenol, which comprises the steps of causing a reaction to take place in the presence of an alkali between a phenol and formaldehyde present in solution in excess of equal molecular proportions, stopping such reaction by neutralizing the alkali before all the formaldehyde has combined, adding ammonia and drying.

2. A process as set forth in the preceding claim in which an alkali is used whose sulphate is insoluble and the alkali is neutralized and the ammonia added at the same time, by the addition to the mass of an ammonium salt of an acid adapted to combine with the alkali to form an insoluble compound.

3. The process of producing molding material which comprises the steps of causing a reaction to take place between a phenol and formaldehyde in the presence of a non-volatile alkali, neutralizing the alkali and adding ammonia before all the formaldehyde has combined, drying and incorporating a filler with the resulting resin.

HARRY M. DENT.